United States Patent [19]

Lederer

[11] 4,072,052
[45] Feb. 7, 1978

[54] FLOW PROPORTIONER

[75] Inventor: Louis Franklin Lederer, Raymond, Nebr.

[73] Assignee: Instrumentation Specialties Company, Lincoln, Nebr.

[21] Appl. No.: 715,320

[22] Filed: Aug. 18, 1976

[51] Int. Cl.² ............................................. G01F 1/52
[52] U.S. Cl. ................................... 73/215; 340/204
[58] Field of Search ............................. 73/206, 215; 235/151.34; 340/204, 206, 347

[56] References Cited

U.S. PATENT DOCUMENTS

| 1,492,829 | 5/1924 | Buckley | 73/215 |
| 1,992,780 | 2/1935 | Skeats | 73/215 |
| 2,088,568 | 8/1937 | Beecher | 73/206 |
| 3,139,613 | 6/1964 | Negri | 340/204 |
| 3,187,318 | 6/1965 | Chapman | 340/204 |
| 3,324,282 | 6/1967 | Baggio et al. | 340/347 |
| 3,549,868 | 12/1970 | Watson | 73/114 |
| 3,866,028 | 2/1975 | Schontzier et al. | 73/215 |
| 3,954,009 | 5/1976 | Lederer | 73/215 |

FOREIGN PATENT DOCUMENTS 608,024   12/1934   Germany ............................ 340/206

Primary Examiner—Herbert Goldstein
Attorney, Agent, or Firm—Vincent L. Carney

[57] ABSTRACT

An apparatus is disclosed for measuring the rate of flow of a fluid or the volume of the fluid flowing past a point. The apparatus includes a first transducer device for measuring a fluid level upstream of a weir and a second transducer device for sensing and decoding an optically encoded Gray-scale disc rotated by the first transducer device to an angular position corresponding to the level of the fluid. The disc is provided with indicia thereon proportional to flow rates and corresponding to different fluid levels. The decoded signals obtained from the disc represent the rate of flow of the fluid. These signals are then integrated to indicate the volume of the fluid flowing past a point for actuating a fluid sampler or a recording device.

27 Claims, 10 Drawing Figures

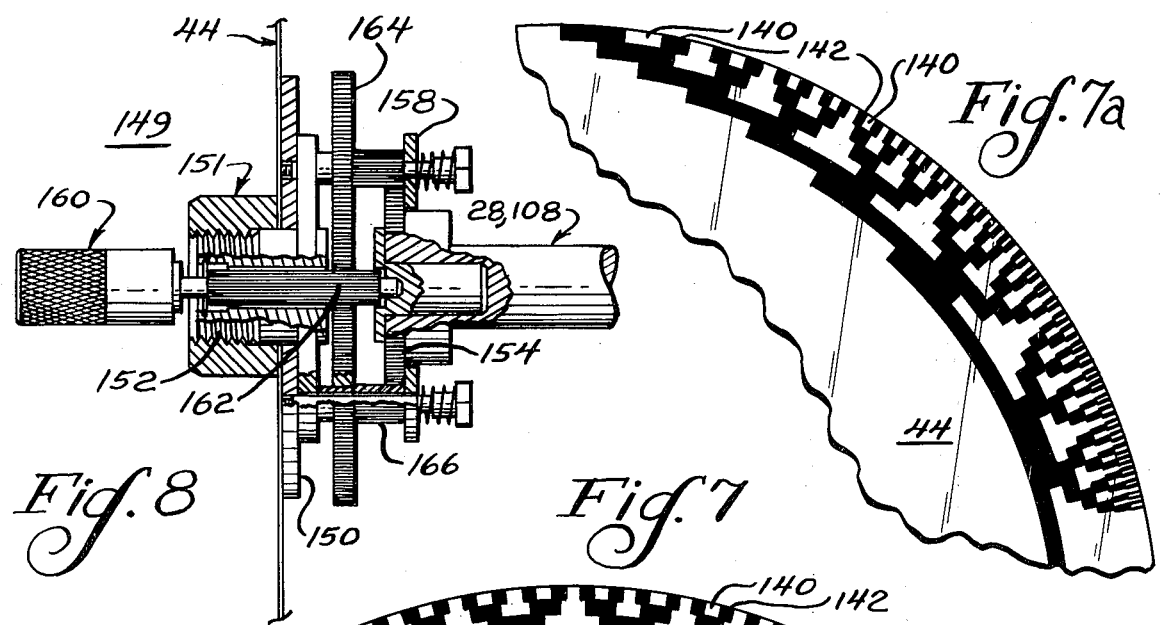
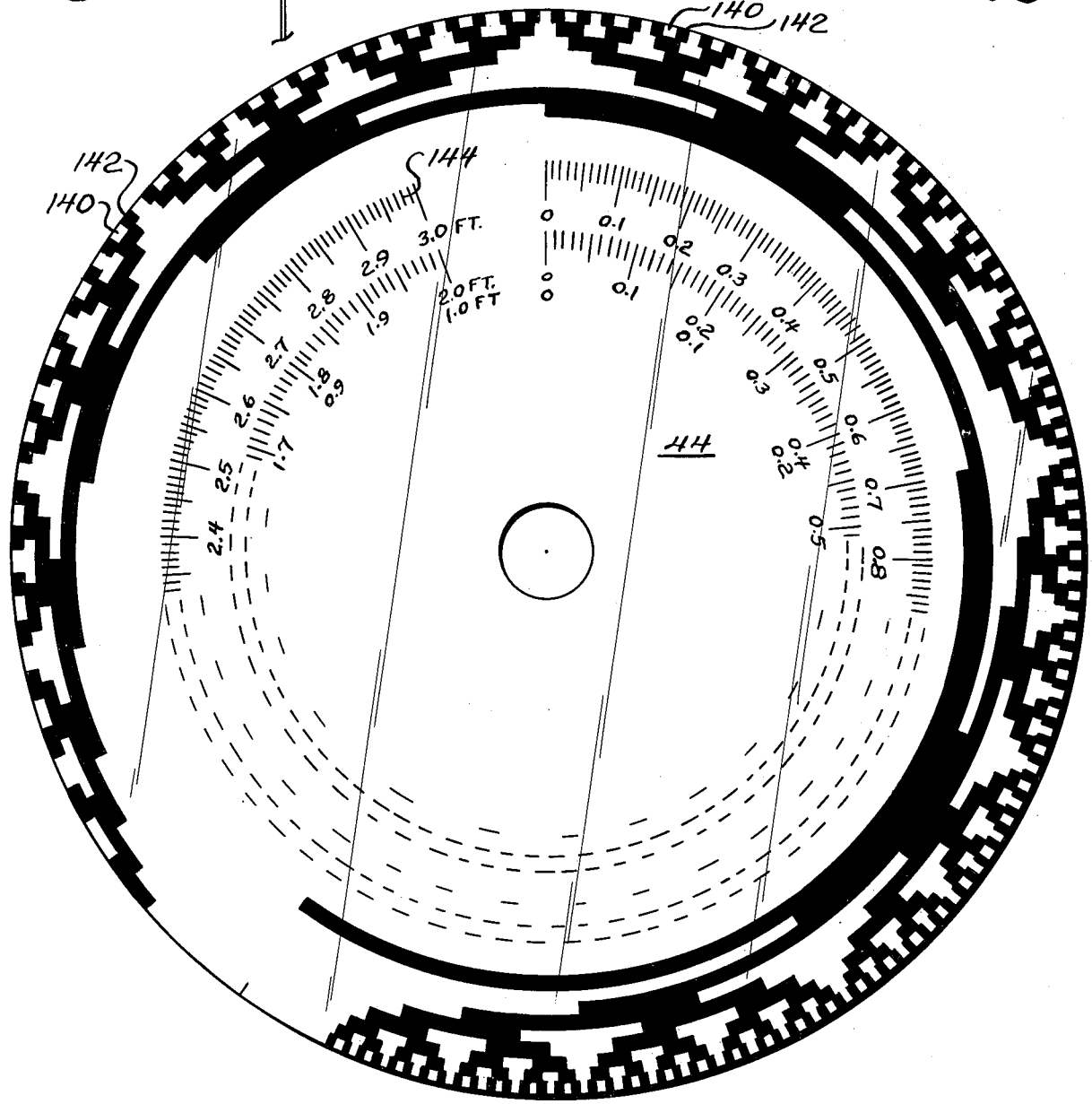

FLOW PROPORTIONER

BACKGROUND OF THE INVENTION

This invention relates generally to flow proportioners and more particularly, it relates to a class of flow proportioners which obtain a signal indicating a characteristic of the rate of flow of a liquid, such as the level of liquid as it flows through a weir and corrects the signal for the shape of the weir or the flow path of the bed through which the fluid is flowing so that it represents the rate of flow of the fluid. The corrected signal is then integrated to provide another signal indicating the volume of liquid flowing past the flow proportioner. The signal from the integrator is, in some applications, used to actuate a fluid sampler at periodic increments of volume of fluid flowing through the flow proportioner.

In one type of prior art flow proportioners of this class, the signal indicating the rate of flow of the fluid moves an arm that rests against a mechanical cam. The mechanical cam lifts the arm close an electrical switch at certain points in each cycle of revolution, which points are selected on the cam to correct the signals for the shape of the flow bed.

This type of prior art flow proportioner has several disadvantages, such as: (1) the cams are mechanical and are of heavy weight, thus causing inaccuracies due to hysteresis; (2) a relatively large amount of power is necessary to operate the flow proportioner; (3) the flow proportioner is expensive because of a large number of relatively complicated and expensive parts; (4) it has to be supplied with power more frequently and does not run unattended for long periods of time; and (5) the output electrical signal is pulse-length modulated and this is a difficult signal to accurately handle for integration purposes.

These problems have been alleviated by a flow proportioner described in co-pending U.S. patent application Ser. No. 295,012 by Louis Franklin Lederer, assigned to the same assignee as the application and filed on Oct. 4, 1972, now U.S. Pat. No. 3,954,009. In this system, the signal indicating the height of the fluid is obtained by a float which positions an electrical stylus on a rotating disc at a radius from its center of rotation that is proportional to the height of the fluid. The rotating disc has a printed circuit upon it which is in circuit with the stylus and with a pulse generator so that pulses are applied to an output circuit during a portion of the time that the movable arm is in contact with the printed circuit. The printed circuit is shaped to correct for the shape of the flow path so that the number of output pulses are proportional to the rate of flow of the fluid. These output pulses are counted electronically to indicate the volume of fluid flowing past the flow proportioner.

However, this system is not without disadvantages since it is unable to provide a visible readout of indicia or manual controls which are readily adjustable for different units of measurement. Moreover, the flow proportioner described in U.S. patent application Ser. No. 295,012 requires substantial electrical power for operation, although less than some prior art flow proportioners, as well as being subject to wear, particularly electrical contact wear, and is not readily usable with some types of liquid height measuring devices.

SUMMARY OF THE INVENTION

Accordingly, it is an object of this invention to provide a novel apparatus for measuring the rate of flow of fluids.

It is an object of the invention to provide a novel apparatus for actuating a liquid sampler.

It is an object of the invention to provide a novel apparatus for measuring the volume of fluid flowing past a point.

It is an object of the invention to provide a novel apparatus for generating a digital signal representing a first variable such as the rate of flow of fluid from an analog signal representing a second variable related to the first variable such as the height of the fluid as it flows through a known flow bed.

It is an object of the invention to provide a novel apparatus for measuring the rate of flow of fluid or volume of fluid that has flowed past a point and which can be easily adjusted to operate in any of several selected units of measurement.

It is an object of the invention to provide a flow proportioner in which a pressure indication of the height of a fluid is obtained through the use of a bubbler without contaminating the atmosphere with non-life-supporting gases.

It is an object of the invention to provide a digital function generator that converts an input signal to an output signal according to a non-linear relationship.

It is another object of the invention to provide an apparatus for measuring the rate of flow of fluids which includes a function generator disc having a Gray-scale code recorded on it representing the non-linear flow rate.

It is another object of the invention to provide an apparatus for measuring the rate of flow of fluids which includes a function generator disc and a level adjustment device connected to the disc for rotating it with respect to a measuring means.

It is another object of the invention to provide an apparatus for measuring the rate of flow of fluids which includes a bubbler system having an adjustable orifice to control the air flow.

It is another object of the invention to provide an apparatus for measuring the rate of flow of fluids which includes electronic servo means responsive to a measuring means for positioning a function generator with respect to a sensor assembly.

In accordance with the above and further objects of the invention, a flow proportioner is provided having a fluid level measuring apparatus, a disc encoder, a sensor and an electronic portion for providing a readout of the rate of flow or the volume of fluid flowing past a point as selected coded electrical signals and as a visual readout in selected units of measurement of rate of flow or volume.

To measure the height of fluid, one embodiment of fluid level measuring apparatus includes a pulley fixed on one end of a shaft and a flexible cord attached over the pulley having a counterpoise on one end of the cord and a float on the other end of the cord. In this embodiment, the raising and lowering of the fluid causes rotation of the pulley which provides an angular indication of the level of the fluid.

A second embodiment of fluid level measuring apparatus includes a supply of gas, a bubbler and a pressure transducer. The supply is an air compressor which communicates with a reservoir tank through a first conduit, and the bubbler communicates with the first conduit through a second conduit which includes a restricted orifice through which air is provided to the bubbler. Connected to the bubbler is a pressure transducer which generates an electrical signal in proportion to the pressure needed to cause the bubbles to flow at a fixed rate from the bubbler against the bubbler, which is immersed in the fluid. The pressure necessary to overcome the pressure exerted by the fluid and to cause the bubbles to flow will be changing as the flow rate changes, which is dependent upon the fluid level. Thus, the pressure will also be proportional to the fluid level. The electrical signal representing the fluid level is then applied to a servo system which controls the position of an anti-backlash drive wheel fixed on one end of a rotatable shaft.

The disc encoder is operatively connected to the end of the rotatable shaft opposite that of the pulley (in the case of the first embodiment) or opposite that of the anti-backlash drive wheel (in the case of the second embodiment) for rotation therewith so that the angular displacement of the disc with respect to a fixed sensor is proportional to the level of the fluid. On the encoder there are Gray-coded indications, each representing the rate of flow of a fluid at a known fluid level in a known flow bed. The Gray-coded indications are extended across arc lengths differing from each other around the disc and the arc lengths are selected to compensate for the shape of the flow bed in accordance with known functions so that the level of the fluid results in a readout indicating the rate of flow of the fluid through that particular flow bed. In the preferred embodiment, the selected arc lengths of the code bits of two adjacent indicia correspond to the increase in height of the fluid resulting from an increase in height of the fluid resulting from an increase in the rate of flow of the fluid from the rate represented by one of the two indicia to the rate represented by the other indicia.

To provide an indication in binary-coded form of the rate flow, the electronic portion provides a readout signal to the sensor at periodic intervals and the sensor reads the Gray code into a Gray-to-binary decoder. This decoder provides an output to an output terminal indicating in binary-coded form the rate of flow of the fluid.

To provide a signal in terms of a number of pulses indicating the rate of flow of fluid, the Grayto-binary decoder applies a jam signal to a presettable down counter which has been preset by the same readout pulse that caused the readout of the sensor. The counter receives pulses from a clock source and, while it is counting down to the zero value, provides a signal to open a gate to clock pulses so that clock pulses are passed through the gate during a portion of each of the intervals between the readout pulses which portion of time is proportional to the rate of flow of the fluid. Consequently, the number of clock pulses passing through the gate indicates the rate of flow of the fluid.

To provide an output proportional to the rate of flow of the fluid in any of several selected units of measurement of flow rate, the pulses from the gate are applied through a rate multiplier which is settable by a register to be multiplied by certain known factors to adjust the number of pulses for the selected unit of measurement such as gallons per minute or liters per second. A recorder that records pulses per unit time will record flow rate in the selected units. To obtain signals indicating the volume of fluid flowing past a point, the pulses from the rate multiplier are applied to a counter which accumulates them so as to indicate volume. Signals from this counter may be applied to another counter with selectable outputs connected to a sample collector so that a certain output can be selected to actuate the sampler after present volumes of fluid have passed the flow proportioner.

It can be understood from the above description that the flow proportioner of this invention has numerous advantages including: (1) it has mechanical simplicity and reliability; (2) it is simple, economical and very accurate; (3) it is readily adjustable to different flow beds; (4) it has function generator discs which are economical to manufacture and can be easily changed; (5) it is operable with a bubbler system that does not release non-life-supporting gases; (6) it has a bubbler system which utilizes pressurized air rather than other compressed gases thereby eliminating the need to replenish the supply periodically; (7) it provides a binary-coded output which is readily connectable to existing recorders; and (8) it is easily adjustable to provide output readings in any of several selected units of measurement.

BRIEF DESCRIPTION OF THE DRAWINGS

The above noted and other features of the invention will be better understood from the following detailed description when considered with reference to the accompanying drawings in which:

FIG. 7 and 7a are respectively, a front plan view of one of the various types of encoded function discs used in the flow proportioner, and a fragmentary front view of a portion of one of such discs; and FIG. 8 is a partial side elevational view, partly in section, of the level adjustment assembly of the invention.

DETAILED DESCRIPTION OF THE PREFERRED EMBODIMENT

Figure 1:
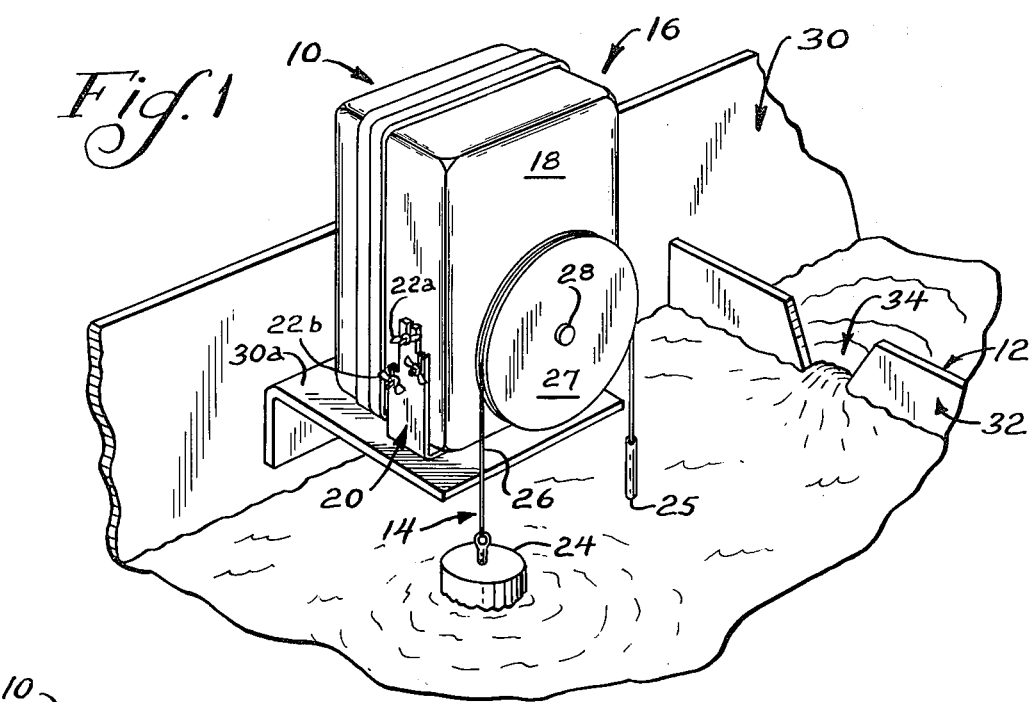
FIG. 1 is a simplified partial perspective view of a flow proportioner according to an embodiment of the invention.

In FIG. 1, there is shown a perspective view of a flow proportioner of fluid meter 10 mounted in operating position with respect to a weir 12 to monitor the flow of fluid therethrough. The flow proportioner 10 includes a float assembly 14 and a metering assembly 16.

Figure 1A:
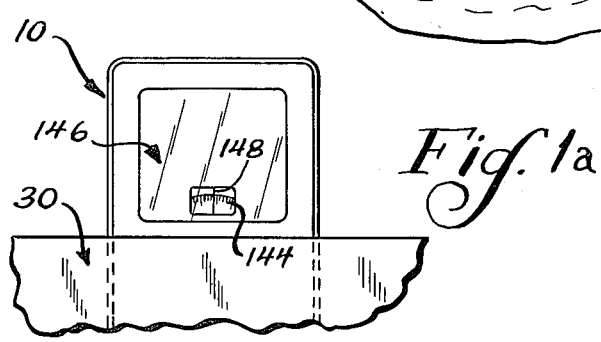
FIG. 1a is a fragmentary front view of the flow proportioner shown in FIG. 1.

The metering assembly 16 includes a housing 18 which contains and protects the operating parts of the metering assembly 16. The housing 18 consists of corrosion-resistant materials such as plastic and stainless steel and is liquid tight to protect the internal operating parts. The front section (FIG. 1a) has a transparent plastic window so that the controls can be observed from the front as will hereinafter be more fully explained.

A substantially U-shaped mounting bracket 20 is fastened to the sides of the housing 18 via threaded bolts 22a and wing nuts 22b as shown in FIG. 1. The mid-portion of the bracket 20 is adapted to receive fastening means (not shown) such as bolts, nuts and lock washers by which the mounting bracket 20 and therefore the housing 18 are mounted to a horizontal support platform 30a. The platform 30a is then in turn mounted to a vertical wall 30 which may be one wall of the weir 12 shown in FIG. 1.

To provide the basic indications or measurements from which the flow proportioner 10 calculates the rate of flow of the fluid, the float assembly 14 includes a float 24, cable 26, a counter-weight 25, a pulley 27 and an input shaft 28, with the float 24 being attached to one end of the cable 26 and the counter-weight 25 being attached to the other end of the cable 126. The float 24 floats on a body of water flowing through the weir 12 and the cable 26 is positioned over a pulley 27 which is mounted to one end of an input shaft 28 for rotation therewith as the cable 26 is moved by the rising and falling of water which lifts or drops the float 24. With this arrangement, as the water level increases, the pulley 28 is rotated in a clockwise direction as shown in FIG. 1, causing the meter input shaft to rotate in a clockwise direction and as the water level falls, the float 24 moves the pulley 27 in a counterclockwise direction causing the meter input shaft 28 to rotate in a counterclockwise direction.

The weir 12 is a conventional V-notch weir having vertical walls, two of which are shown at 30 and 32, with the wall 30 supporting the horizontal support platform 30a and the wall 32 being a vertical retaining wall connected to the wall 30. The wall 32 has a V-shaped notch at 34 permitting the flow of water therethrough so that the retaining wall 32 creates a waterhead in which the float 24 floats.

Although in FIG. 1 the float assembly 14 and the weir 12 are shown cooperating with the metering assembly 16 to provide basic measurements from which the metering assembly determines the rate of flow of a fluid, other conventional arrangements may be used to provide basic indications. For example, a stilling well may be used with a different type of float, actuated from a pulley in a conventional manner. Moreover, mechanisms which do not utilize a float at all may be used and one such mechanism will be described hereinafter as another embodiment of the invention.

Figure 2:
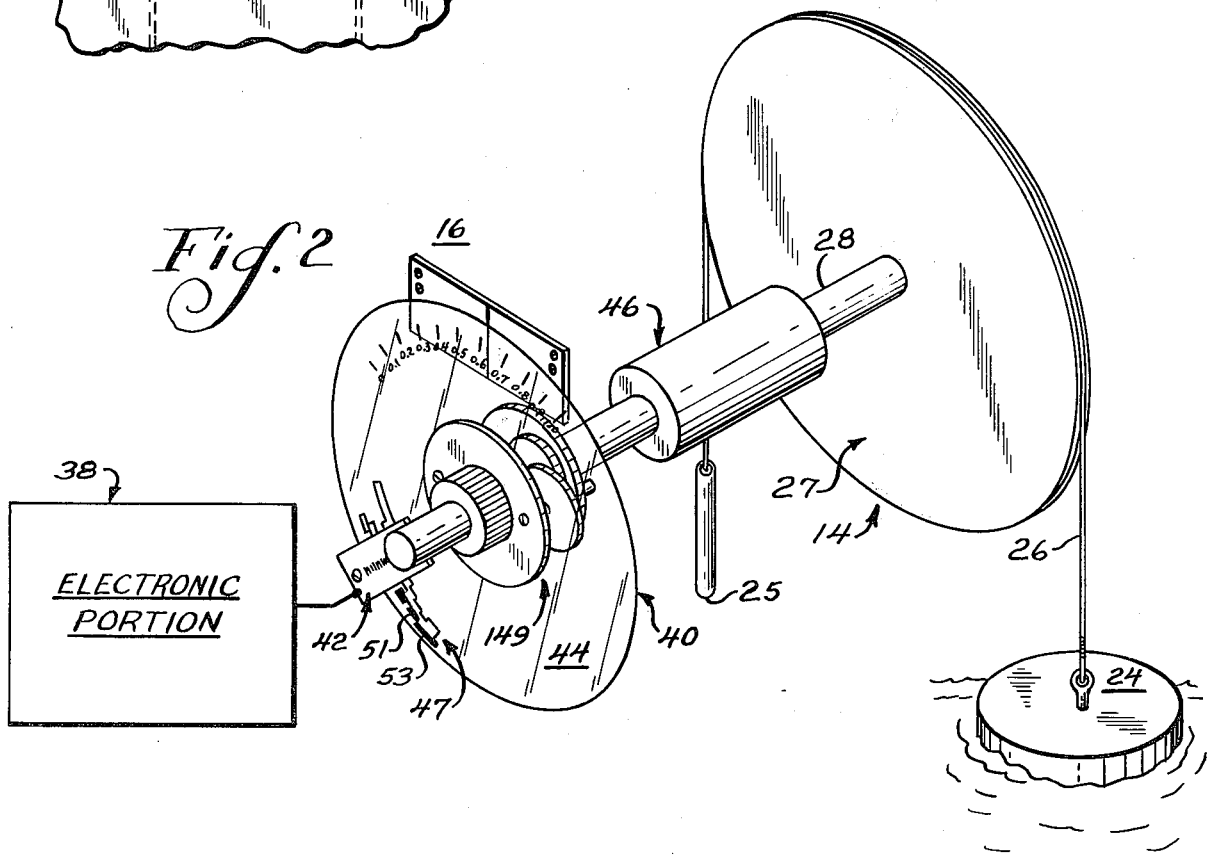
FIG. 2 is a simplified diagrammatic perspective view, partly in phantom illustrating certain moving parts of the flow proportioner of FIG. 1.

In FIG. 2, there are shown in a simplified diagrammatic perspective view, the float assembly 14 and the operating parts of the metering assembly 16 as they are connected together for operation.

The metering assembly 16 includes an electronic portion 38, function disc assembly 40 and a sensor 42, with the function disc assembly 40 being connected to the float assembly 14 through the meter input shaft 28 to receive the basic measurements indicating the rate of flow of fluid and to the electronic portion 38 through the sensor 42 to which it provides a signal indicating the amount of fluid that has passed the float. As will be explained in greater detail hereinafter with reference to FIG. 3, the electronic section 38 uses this information to generate actuating signals such as signals to start a water sampler.

To operate on the basic measured data by a function, the sensor 42 is stationary and electrically connected to the electronic portion 38 and the function disc assembly 40 includes a function disc 44 which rotates with respect to the sensor 42 to operate upon the basic measured data. The function disc 44 is connected to the other end the shaft 28 opposite the pulley 27 through a bearing assembly 46 for rotation in unison therewith so that its angular position in relationship to the stationary sensor 42 changes in proportion to the height of the fluid as determined by the float 24.

The function disc 44 is a rotatable plastic disc having printed upon it an opaque Gray code upon a translucent or light-passing base or else a translucent Gray code upon an opaque base or else a colored Gray code upon an opaque base. In the preferred embodiment, the base of the function disc 44 is light passing and the Gray code is printed for photo-cell sensing.

The coded portions on the function disc 44 are spaced in accordance with a function so that the argument of the function is represented by the arc length rotated through the sensor 42 for each different rotation of the pulley 27 representing a different level of the fluid as indicated by the level of the float 24. In other words, the Gray coded numbers are alternately transparent and opaque areas located circumferentially around the outer edge of the disc and spaced across different arc lengths to provide an output value to the sensor 42 for each argument of a function represented by the height of the fluid. The output value represents the rate of flow of fluid with distortion caused by the flow bed removed. To enable the function to correct for such distortion, the flow proportioner must measure flow in conjunction with a primary measuring device such as a weir or flume, for which a known relationship between water-level and flow rate exists.

To obtain the value on the function disc 44 corresponding to the flow rate, the function disc assembly 40 rotates the function disc through an angle that is proportional to changes in water level so that equal changes in water level cause equal angular changes in the position of the function disc. Because the water level is related to flow rate by a non-linear function, the angles dividing the Gray-code indications represent this non-linear function with larger angles representing smaller changes in rate of flow with the same change in height than angles representing greater changes in the rate of flow with the same change in height. Consequently, the arc lengths of Gray-code indications are not equal and tend to get smaller for higher water-level positions in a weir. The Gray code is composed of a number of bits assigned in such a way that only one bit changes at each increment or decrement as it changes in position.

To avoid ambiguity in sensing the indicia on the function disc 44, the bit positions of each coded number are curved and located radially of each other so that each coded number is pie-shaped with concentric segments of a circle forming the bit positions. Since the functions correlating liquid height and flow rate are continuous, the indicia of the Gray code cause on only one mark to change position for each number on the disc 44. For example, in FIG. 2, two adjacent numbers are shown at 47 on the function disc 44, one including the bit mark 51 in one section and the other by the mark 53 in another section. Only the location of the marked section and the arc lengths of the bit position change, with the position of the mark indicating the value of the rate of flow and the arc lengths of the bit position change, with the position of the mark indicating the value of the rate of flow and the arc length of the pie-shaped section relating the height of the liquid to the rate of flow. To provide an indication of the flow rate to the electronic portion 38, the sensor 42 is periodically read by applying light from light-emitting diodes to the function disc 44 directly under it and reading the Gray code with photo-transistors in the sensor 42. This Gray code indicates the rate of flow corrected for distortion since the argument represented by the height of the fluid has been developed by the function disc 44 to provide a direct read-out free of distortion for the rate of flow of the fluid.

Figure 3:
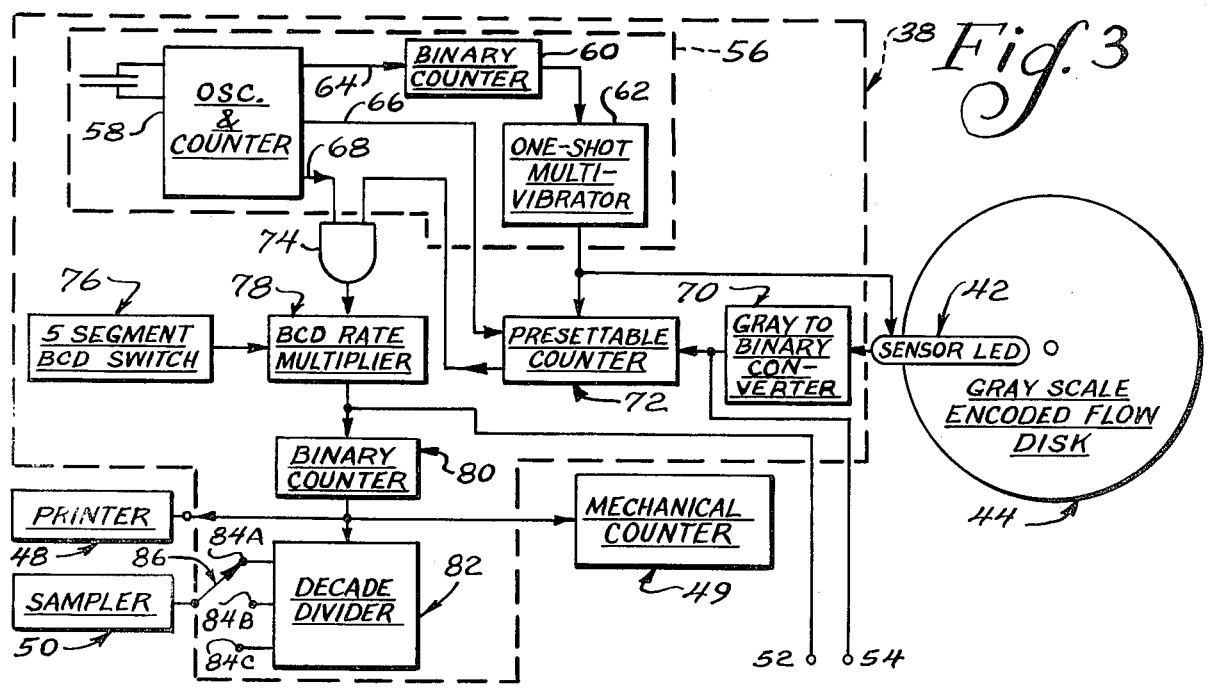
FIG. 3 is a diagrammatic view of the principal electrical components of the flow proportioner of FIG. 1.

In FIG. 3, there is shown a simplified diagrammatic view of the electronic portion 38 cooperating with- (1) the sensor 42 and function disc 44 from which it receives information indicating the rate of flow of fluid; (2) a printer 48 which records information received from the electronic portion 38; (3) a sampler 50 which is energized to draw samples of fluid at periodic volumes of flow past a fixed point under the control of signals from the electronic portion 38; (4) output terminal 52 which receives signals from the electronic portion 38 indicating the rate of flow of fluid in a selected unit by a number of pulses; and (5) output terminal 54 which receives signals from the electronic portion 38 indicating in binary code the rate of flow of fluid past a point.

To synchronize the electronic portion 38, a timing section 56 includes an oscillator and counter 58, a binary counter 60, and a one-shot multivibrator 62. The oscillator which drives a counter, three outputs of which are connected respectively to a different one of the conductors 64, 66 and 68 to apply a different one of three pulse trains to each of the three conductors, with the conductor 64 being connected to count input of the binary counter 60, the output of which is connected to the input of the one-shot multivibrator 62. The one-shot multivibrator 62 has its output connected to the sensor 42 to provide a periodic read-out signal to read the Gray code from the coding disc 44.

To supply a binary signal to output terminal 54 indicating the rate of flow of fluid in a binary code, read-out pulses from the one-shot multivibrator 62 are periodically applied to the sensor 42 at intervals determined by the oscillator and counter 58 and the binary counter 60. This read-out pulse is a narrow pulse that causes the light-emitting diodes and photo-transistors to be energized to read the Gray code adjacent to the sensor. This Gray code indicates the rate of flow of the fluid corrected for distortion by the function impressed thereupon by the angular spacing between encoded numbers on the disc. The output signal from the sensor 42 is applied to a Gray-to-binary converter 70, the output of which is connected to the output terminal 54 to provide the flow rate in a binary code.

To generate a number of pulses proportional to the rate of flow, the electronic portion 38 includes a pre-settable counter 72 and an AND gate 74, with one input of the AND gate 74 being connected to the conductor 68 to receive counting pulses and the other being connected to an output of the pre-settable counter 72. A first input terminal of the pre-settable counter 72 is electrically connected to the conductor 66, a second input terminal is connected to the output of the one-shot multivibrator 62 and a third is connected to the output of the Gray-to-binary converter 70.

With these connections, the one-shot multivibrator 62 resets the pre-settable counter 72 and shortly thereafter the Gray-to-binary converter 70 applies a signal to the presettable counter 72 setting it at the value of the flow rate. Pulses from conductor 66 count to that pulse rate, during which time the output from the pre-settable counter applies a high signal to the AND gate 74 causing it to be open and apply pulses from conductor 68 to the output of the AND gate 74. When the count on the counter 72 reaches the present amount, the AND gate 74 is closed by a low signal from the output of the pre-settable counter to limit the number of pulses applied to the output of the AND gate 74 between read-out pulses to a number of pulses that are proportional to the rate of flow of the fluid.

To provide an output to conductor 52 indicating the rate of flow of fluid in accordance with a selected one of several units of measurement, the electronic portion 38 includes a five-segment binary-coded decimal switch 76 and a binary-coded decimal-rate multiplier 78 with the switch 76 being connected to the rate multiplier 78 to control the multiplication factor of the rate multiplier in accordance with a value manually set into it by the switch. The input terminal of the binary-coded decimal-rate multiplier 78 is connected to the output of the AND gate 74 to receive pulses proportional in number to the rate of flow of the fluid and the output of the rate multiplier 78 is connected to the output terminal 52 to provide a number of output pulses proportional to the rate of flow but multiplied by the number set into the switch 76, thus converting the output of the rate multiplier to any unit of measurement unit such as gallons per minute or liters per second which may be desired as a read-out for the rate of flow of fluid.

To provide signals indicating the volume of fluid flowing past the flow meter to: (1) the printer 48; (2) the mechanical counter 49; and (3) the sampler 50, the electronic portion 38 includes a binary counter 80 and a decade divider 82. The binary counter 80 is connected to receive the output from the binary-coded decimal-rate multiplier 78 and to apply signals to the printer 48, the mechanical counter 49 and the divider 82.

Since the output of the binary counter is the integral of the pulses applied to it, its output indicates the amount of fluid flowing past a point. This value is printed by the printer 48 and registered by the counter 49. To control the sampler 50, the decade divider 82 includes a plurality of selectable output contacts indicated as 84A–84C in FIG. 3 and a switch arm 86 for selecting any one of the output contacts. The switch 86 may be connected to any one of the contacts 84A–84C so that the sampler 50 is operated at selected fixed increments of volume of fluid flowing past the flow meter which increments are set by the switch 86.

Figure 4:
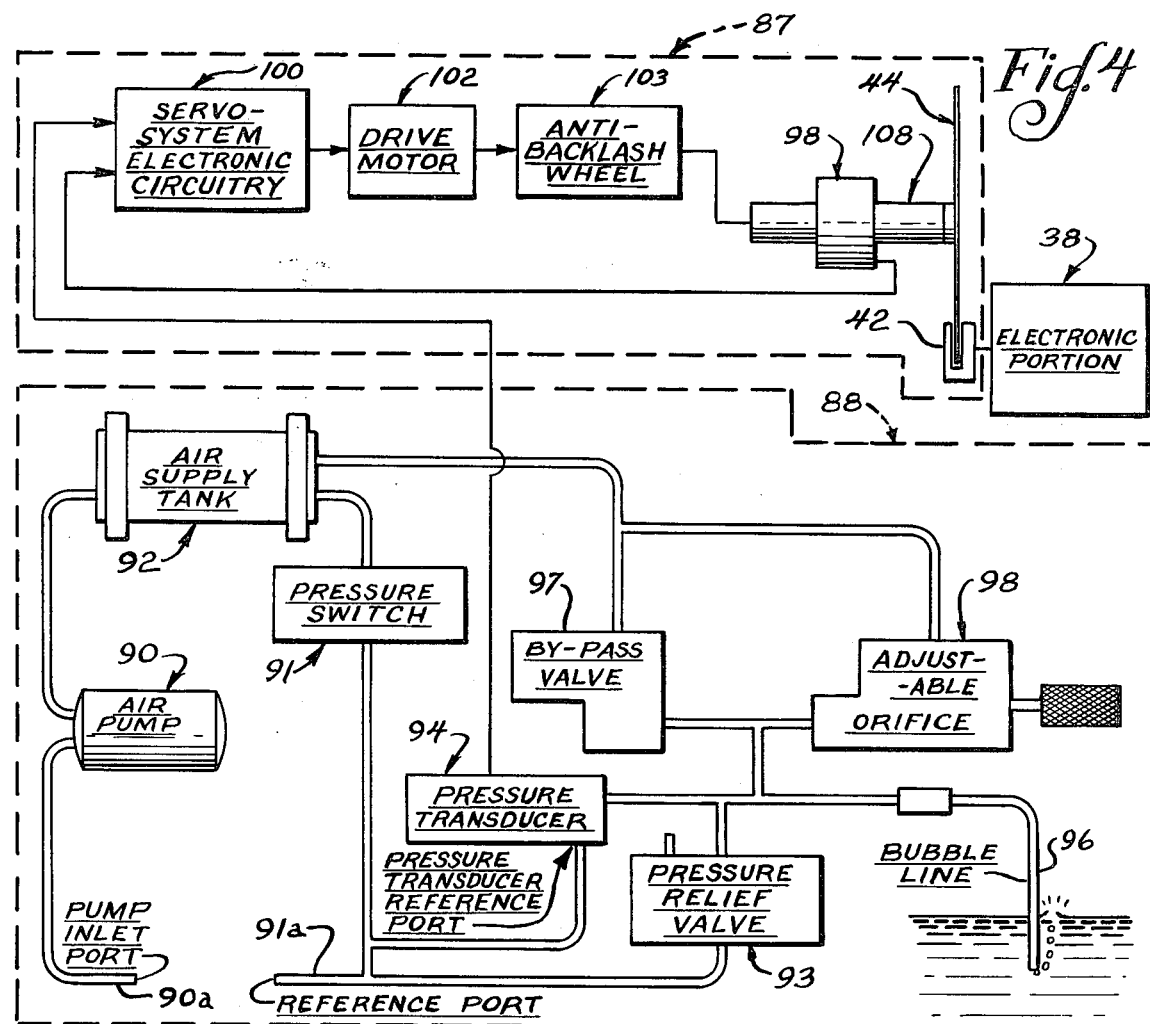
FIG. 4 is a diagrammatic view of another embodiment of the invention.
Figure 5:
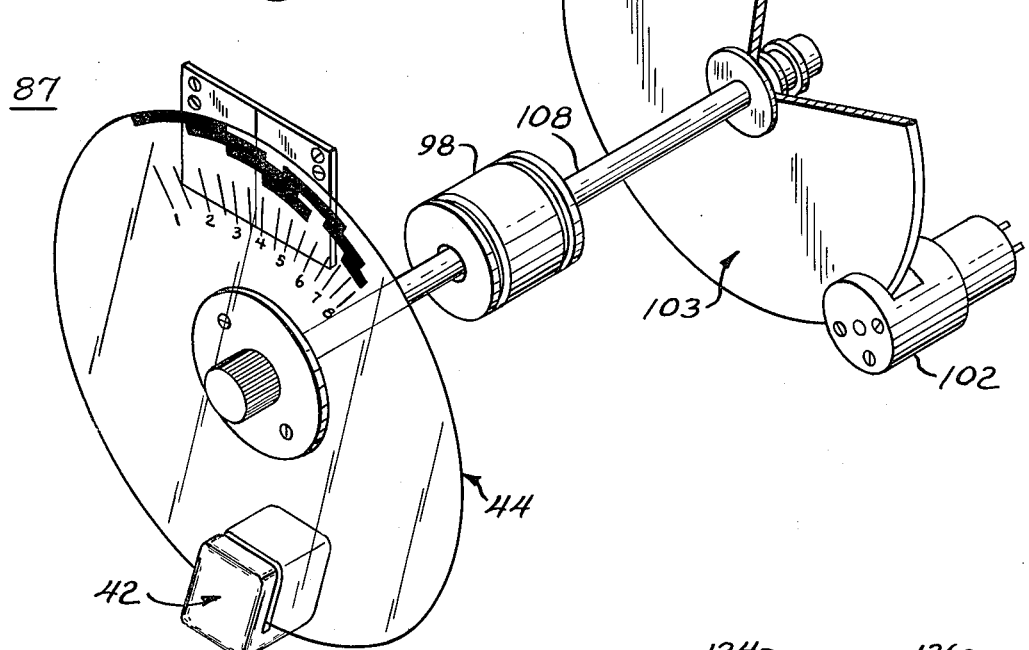
FIG. 5 is a simplified perspective view of the moving parts of the embodiment of FIG. 4.

In FIGS. 4 and 5, there are shown a second embodiment of a function disc assembly 87 and fluid level measuring system 88, with the function disc assembly 87 being shown schematically in FIG. 4 connected to the fluid level measuring system 88 and being shown alone in a simplified perspective view in FIG. 5.

It should be noted that the function disc assembly 87 includes the function disc 44 and sensor 42 as used in the first embodiment and as shown in FIG. 3. The only differences between the two embodiments reside in the manner of measuring the fluid level (fluid level measuring system 88) and rotating the shaft 108 with the function disc 44 mounted on its one end in proportional relationship to the fluid level change. These differences will now be discussed in detail hereinbelow.

In order to measure the level of the fluid in the second embodiment, the fluid level measuring system 88 comprises a pump 90, an air supply tank 92, a pressure transducer 94 and a bubble line or bubbler 96. The intake side of the pump 90 is connected to the outside (atmospheric pressure) through an inlet port 90a, and the exhaust side is fed to the tank 92 with pressurized air. One side of a pressure switch 91 is connected to the tank 92 for monitoring the air pressure. The other side of the pressure switch 91 is connected to atmospheric pressure via a reference port 91a. When the pressure in the tank drops below a certain value, the pressure switch 91 activates the pump 92 for a fixed amount of time so as to maintain the pressure in the tank constant.

The output from the tank 92 is fed by one of two paths to the bubble line 96 which is inserted into the flow stream for measuring the fluid level. The first and normal path is through an adjustable orifice 98 which controls the flow rate of air escaping from the bubble line beneath the fluid or water, the level of the fluid determining the pressure required to create bubbling. The second path is through a by-pass valve 97 connected in parallel with the orifice 98 and electrically operated to open when the fluid level is rapidly increasing at a pre-determined rate. This allows the measuring system to normally operate at a low bubble rate and thus conserving power consumption and yet still provide a correct and accurate response due to a quickly rising fluid level.

The pressure transducer 94 is connected between the bubble line 96 and the reference port 91a for measuring the air pressure in the bubble line. This is accomplished by applying the pressure required to create the bubbling to the pressure transducer 94 which is a function of the fluid height. Specifically, the pressure applied to the pressure transducer 94 depends primarily on the hydrostatic head pressure created on the open end of the bubble line 96 by the fluid. In order to avoid damage to the transducer due to over pressure caused by such as an obstructed bubble line, a pressure relief valve 93 is connected in parallel with the transducer 94. When the pressure being measured exceeds a certain limit, the relief valve 93 will be activated to cause the pressure to pass through it to the reference port 91a.

Since the air pressure in the bubble line measured by the transducer 94 is proportional to the pressure of the fluid above it, the output from the transducer in the form of an electrical signal is proportional to the fluid level. For providing signals to the electronic portion 38 indicating the rate of flow of fluid from the electrical signal generated by the pressure transducer 94, the function disc assembly 87 includes a potentiometer 98, a servo system 100, a drive motor 102, a function disc 44, and a sensor 42. The function disc 44 and sensor 42 cooperate together to provide signals to the electronic portion 38 in the same manner as in the first embodiment shown in FIGS. 1-3, and as previously mentioned, may be identical to the function disc and sensor of first embodiment. The sensor 42 develops digital signals indicating the rate of flow corrected for distortion from the measured values for application to the electronic portion 38 for further processing or transmission to end use devices.

The drive motor 102 operatively connected to anti-backlash drive wheel 103 which is mounted on one end of shaft 108 positions the disc 44 connected to the other end of the shaft 108 to provide a signal to the sensor 42 corresponding to the rate of flow of fluid indicated by the level of fluid measured by the fluid level measuring system 88. The drive motor is controlled by the output from the servo-system 100, and the output from the potentiometer 98 which is connected to the shaft 108 is feed to one input of the servo-system 100.

The pressure transducer 94 applies a signal to the other input of the servo system 100 which moves the motor until an electrical signal provided by the potentiometer 98, which is adjusted by movement of the shaft 108, is at a value which counterbalances the signal received from the pressure transducer 94. After calibration, this servo-system properly positions the function disc 44 with respect to the sensor 42 to provide coded information to the electronic portion 38 indicating the rate of flow of fluid.

In FIG. 5, there is shown a simplified perspective view of the function disc assembly 87, having the sensor 42 and the function disc 44, with the function disc including numbers coded in a Gray code having bits positioned at different angular distances from a shaft 108 to provide a function which corrects for non-linear distortion in the measured values of the level of fluid and results in an output indicating the rate of flow of fluid. As shown in this figure, the motor 102 drives the shaft 108 through the wheel 103 and the shaft 108 positions the potentiometer 98, the output from the potentiometer 98 being applied to the servo system 100 (FIG. 4) to stop the motor at the proper location to correct for distortion and to provide an output signal dependent upon the angular position of the function disc 44 to the sensor 42 which is directly related to the rate of flow of the fluid.

Figure 6:
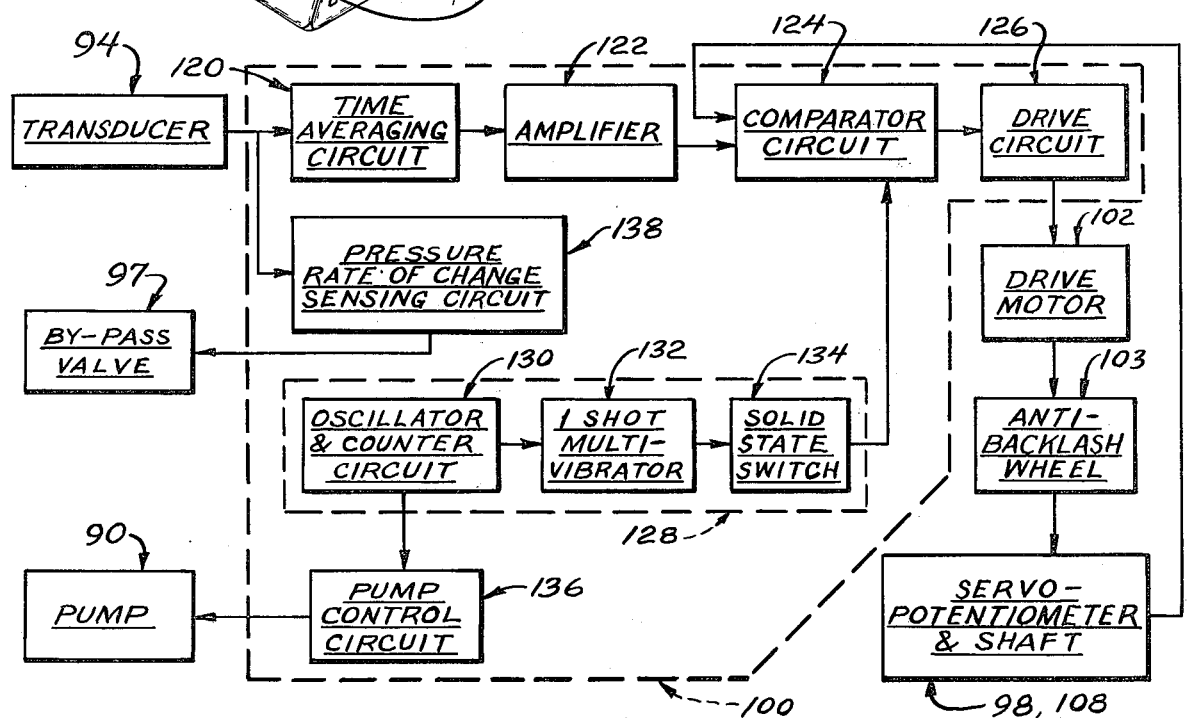
FIG. 6 is a block diagram of the electronic circuitry of the servo-system as shown in FIG. 4.

Referring to FIG. 6 showing a block diagram of the electronic circuitry of the servo-system 100, an explanation of its operation will now follow. At the outset, the input to the servo-system 100 is from the output of the pressure transducer 94. Specifically, the output of the transducer 94 is fed into the input of a time averaging circuit 120 which performs a time-average on the signal and also inverts and scales it to an appropriate value at the output thereof. The output of the averaging circuit 120 is connected to an amplifier 122 which feeds a first input of a comparator circuit 124. The second input of the comparator circuit 124 is from the servo-potentiometer 98 mounted on the shaft 108. If the signals from the transducer 94 via the amplifier 122 and the servo-potentiometer 98 are not the same, an error signal will be generated at the output of the comparator circuit 124 to actuate the drive motor 102 via drive circuit 126. The drive motor 102 is connected to the servo-potentiometer 98 and shaft 108 via the anti-backlash wheel 103. Thus, the rotation of the drive motor 102 causes the servo-potentiometer 98 to rotate until the signals from the transducer 94 and potentiometer 98 are balanced or equal.

A "bump" circuit 128 includes an oscillator and binary counter circuit 130, a one-shot multivibrator 132 connected to the output of the counter 130 and a solid-state switch 134 connected to the output of the multivibrator 132. The output of the switch 134 forms a third input of the comparator circuit 124 which causes the comparator to latch up momentarily as controlled by the counter 130 and multivibrator 132 for applying power periodically to the drive circuit 126. This will, in turn, cause the drive motor 102 to be jarred slightly and to keep it in motion so as to reduce errors in the servo-system due to static friction.

The oscillator and counter circuit 130 also feeds a pump control circuit 136 which includes the pressure switch 91. If the pressure in the tank drops below a desired constant value, the pressure switch 91 will open and the pump control circuit 136 will activate the pump 90 so as to maintain a constant pressure in the tank 92.

The output of the transducer 94 is also fed into a pressure rate-of-change sensing circuit 138. If the rate-of-change in the pressure is maintained over a certain period, the output of the sensing circuit 138 will cause the opening of the by-pass valve 97 for allowing additional air to the bubble line 96 and thereby permitting the flow proportioner to respond accurately to rapidly rising fluid or water levels.

In FIG. 7 and 7(a), there are shown exploded front plan views of various types of encoded function discs used in the flow proportioner. The Gray coded numbers are alternately transparent 140 and opaque 142 areas located circumferentially around the outer edge of the disc 44 and spaced across different arc lengths to provide an output valve to the sensor 42 for each argument of a function represented by the level of the fluid. FIG. 7 shows an encoded function disc for use in the flow proportioner when the primary measuring device is a Cipolletti weir. Correspondingly, FIG. 7(a) depicts in part a function generator disc for use with a V-notch weir. The fluid level, as measured by the float or the bubbler system, can be visually displayed by a level indicating scale 144 marked or printed on the function disc 44. The scale 144 may be printed in English units, metric units or any other appropriate units and can be read through a window 146 (FIG. 1a) without opening up the flow proportioner. The scale value on the disc 44 which becomes aligned with the vertical line 148 on the flow proportioner represents the indicated fluid level reading.

There is shown in FIG. 8 of the drawings a level adjust assembly 149 that permits vernier adjustment of the function disc 44. The function disc 44 is mounted on a hub 150 and is held fixedly by a nut 151 threaded onto an externally threaded portion 152. The level adjust assembly is utilized in conjunction with the first embodiment (FIG. 2) in which one end of the shaft 28 is attached to the pulley 27. (the second embodiment shown in FIG. 5 uses preferrably an electronic level or zero adjust.) The other end of the shaft is connected to gear 154. A slip plate 158 is spring biased against the rear surface of the gear 154 so that the entire level adjust assembly 149 will rotate normally in unison. However, when it is necessary to adjust the indicated liquid or fluid level reading on the flow proportioner 10 so that it matches the liquid level in the primary measuring device (the weir or flume) as indicated by a static scale, a level adjust knob 160 which is rotatable inside the hub 150 is rotated to generate a torque through a planetary gear system consisting of gears 162, 164, 166 and 154 which is sufficient to overcome the static friction between the slip plate 158 and the gear 154. Since the shaft 28 (108) is constrained from movement due to the pulley 27 or anti-backlash wheel 103, the hub 150 and the function disc 44 will be rotated in a direction opposite to the direction in which the level adjust knob 160 is rotated. The knob can be mounted for convenient access from the front of the flow proportioner 10 so as to facilitate easy adjustment of the angular position of the function disc 44 to match the fluid level reading in the primary measuring device.

In assembling the flow proportioner 10, the function disc 44 is prepared with the proper function to accommodate the location of the liquid-level sensing apparatus which may be a bubbler or a float. For a V-notched weir and a float of the type shown in FIG. 1, the rate of flow of the fluid is proportional to the change in the level of the fluid raised to the five-halves power. However, other types of measuring arrangements require a different function and a different function disc must be prepared for each different function.

Although the meter utilizes a function disc having, printed upon it, a desired function to correlate the level of the liquid with its rate of flow, obviously other types of function generating apparatuses can be used. To be suitable, a function generating apparatus must be able to remove the irrelevant information or distortion and either provide a signal that can be easily integrated or that can be converted to a signal that can be easily integrated.

However, because of its simplicity, the function discs in the preferred embodiments have particular advantages in the fluid proportioner 10 described herein. One advantage is that the function discs can be prepared using existing printing techniques. Accordingly, other different function discs may be inexpensively made available to provide the necessary function for other different-shaped weirs or for other modifications to the equipment that require a change in the function. Moreover, the function can be computer generated. A second advantage is that the function discs are easily replaceable and may be conveniently ordered and shipped by mail because of its compact size and light weight. A third advantage is that only a small amount of power is required to drive the function discs and there is very little inertia in the motion of the function discs that would cause hunting or overshooting when positioned.

To mount the flow proportioner 10 for measuring the rate of flow of the liquid, the horizontal support platform 30a is positioned adjacent to a vertical wall 30 near the stream of fluid the rate of flow of which is to be measured. This wall may advantageously be the vertical wall of the weir 12. The horizontal support platform 30a is mounted to the wall by means such as bolts fastened through the wall at such a location that, if a float is used, the float rests in the liquid within the weir area with room to rise and fall with changes in the liquid level without rising above the bottom surface of the metering assembly 16 (FIG. 1). If a bubbler is used, the positioning of the meter is not critical since the bubbler need only be immersed in the fluid near the meter.

It should be understood that the flow proportioner 10 may be mounted horizontally as well as vertically on the support platform 30a or supported by the use of a hook and suspension harness (not shown).

In operation, the flow proportioner 10 first obtains basic indications from the fluid, which indications contain information concerning the rate of flow of the fluid and also non-linear distortion imparted to the indications by factors such as the shape of the channel in which the fluid flows. These indications are operated upon with the function incorporated within the flow proportioner 10 to remove the distortions and to convert the indications into a form that is easily processed to indicate the rate of flow of the fluid. The rate of flow of the fluid is then integrated to provide information concerning the volume of fluid that has flowed past the flow proportioner and this information is used to generate control signals that may be used for a variety of purposes, one of which is to actuate a liquid sampler to draw a sample from the body of fluid each time a preset volume of fluid has flowed past the flow proportioner.

In the operation of the first embodiment (FIG. 1), basic indications containing information about the rate of flow of the fluid are obtained from the float 24 which floats in front of the weir 12. The liquid level in front of the weir 12 rises and falls as the rate of flow rises and falls, causing the float 24 to rise and fall in a manner indicating the rate of flow of the fluid in the body of water. The indications containing information about the rate of flow are imparted to the meter input shaft 28 as the float 24 rises or falls turning the pulley 27 in a manner that reflects the rate of flow of the liquid.

In the operation of the second embodiment (FIG. 4), the basic indications are obtained from the bubbler system 88 which includes the bubbler 96 that is immersed in the liquid near the meter. The bubbler system applies pressure to a transducer 94 which pressure changes in proportion to the level of the fluid above the bubbler. The transducer 94 generates electrical signals proportional to the pressure and transmits them to one input of the servo system 100 for actuating the drive motor of the function disc assembly 87 (FIGS. 4 and 5). The servo system positions the shaft 108 and function disc 44 in a manner proportional to the rising and falling of the fluid.

The rotating of the meter input shaft 28 in the first embodiment shown in FIGS. 1 and 2 or shaft 108 in the second embodiment shown in FIGS. 4 and 5 is not ordinarily directly proportional to the rate of flow of the fluid because an increase or decrease in the level of the fluid is distorted non-linearly by other factors such as by the shape of the weir 12. In a V-notched weir, such as that shown in FIG. 1, the rate of flow of the fluid is proportional to the changes in the level of the fluid within the weir to five-halves power.

To remove this non-linear distortion, the Gray code on the function disc 44 is arranged so that each number is composed of concentric bit positions having arc lengths related to the arc lengths of the bit positions of adjacent numbers as adjacent levels of the fluid in the type of body of fluid that is being sensed are related to the rates of flow of the fluid in that body of water. Stated another way, the level of the fluid provides an argument for the function described by the angular arc lengths of numbers encoded in the Gray codes around the circumference of the disc 44 which argument has a solution sensed by a sensor 42 that reads the Gray code indicating the rate of flow for the given height of fluid.

To convert the information concerning the rate of flow into binary electrical signals, the Gray code on the function disc 44 is periodically sensed by a stationary sensor which applies the sensed code to a Gray-to-binary converter 70. This converter provides a binary output representing the rate of flow of the fluid.

To provide a continuous indication of the rate of flow and the amount of fluid that has flowed past a point, the binary output of the converter 70 is transmitted to a pre-settable counter, which is reset periodically by a one-shot multivibrator at the same time as the read-out from the encoded disc. A clock counter counts the presettable counter after it is reset to the value set into it by the Gray-to-binary converter, with an output from the pre-settable counter opening a gate which permits other clock pulses to flow through the gate during the portion of each period of time that represents the rate of flow so that the number of pulses passing through the AND gate indicates the rate of flow.

The pulses passing through the AND gate are applied to a rate multiplier which multiplies the number of pulses by a factor that establishes the units of measurement representing the rate of flow such as gallons per minute or liters per second. The output from the rate multiplier is a continuous periodic reading of the rate of flow in any unit set into the rate multiplier.

To provide information concerning the quantity of fluid that has flowed past a point, the pulses from the rate multiplier are applied to a counter 80 which counts them, thus providing an output which is the integral of the rate of flow and therefore indicates the volume of fluid that has flowed past the meter. This output is recorded in a printer, an analog strip chart recorder or a mechanical counter and may also be used to actuate a sampler at pre-settable increments of volume flowing past a point.

From the above description, it can be understood that the fluid meter of this invention has several advantages, such as: (1) it is relatively simple mechanically and very reliable; (2) it is light in weight and easy to handle; (3) it is economical and accurate; (4) it operates for a relatively long period of time without being reset; (5) it is durable and able to resist corrosive environments in which it may be used; (6) it is adjustable to provide readings in selected units; and (7) it is easily adjusted to different flow beds requiring different non-linear functions.

The fluid meter 10 is economical because it has relatively few parts and these parts are inexpensive. The integration of the flow rates is performed by an inexpensive counter and the operation of calculating the relationship between the basic indications and the actual rate of flow of fluid is accomplished by an inexpensive printed disc and positioning apparatus. Moreover, it is inexpensive to adapt a meter for use in different environments since it is only necessary to change the function disc, which is a relatively inexpensive unit and is easily replaced, to accommodate different measuring conditions.

The flow meter 10 is light in weight and easy to handle because it has few moving parts and does not require any substantial amount of power. The electrical circuit requires a very low power to operate since it consists essentially of low power digital circuits. There are few moving parts and these moving parts are very light in weight, thus not requiring any substantial amount of power. Since a relatively low power is required, a heavy power supply is not necessary and the apparatus is easy to handle and move.

Because of the low power requirement, the unit may run for a long period of time on a relatively small battery without being reset. The primary consideration in resetting such a unit is the length of time it can run on the energy stored within it.

The fluid meter 10 has only one opening in the first embodiment that accommodates a moving part. This is the opening accommodating the meter input shaft 28. There are also provided an electrical terminal (not shown) for supplying power and a switch (not shown) for selecting the volumes of liquid at which a signal is to be provided. However, the terminal and switch do not move and may be easily sealed. Because the terminal and switch are easily sealed and the casings are of corrosion-resistant material, the unit is able to withstand corrosive environments for long periods of time.

The fluid meter 10 is also very precise. It is precise because there is a relatively low amount of friction. The only moving part is the rotating function disc and the slowly-moving input shaft which is counterbalanced.

The use of the rate multiplier and pulses enables different units to be directly recorded easily with the same equipment. Since the equipment is adaptable for use either with a bubbler system or with a float, there is economy in its construction since it may be produced in larger volumes.

The bubbler system itself is suitable for closed areas such as sewers since it uses a small pump and a tank rather than a source of compressed gas. It is also able to operate for a long period of time because of the use of the pump.

It should be clearly understood that many other types of function generators which are not disc-shaped could be used just as well. For example, any configuration of revolution such as a cylinder, or a rectangular sheet which moves sideways and the like could be utilized. In addition, the printer is only one example of recording devices which can be used in the present invention. An analog strip chart recorder which records pulse rate signals or a mechanical counter and other recording devices wellknown in art could be used.

While there has been illustrated and described what is at present to be preferred embodiments of the present invention, it will be understood by those skilled in the art that various changes and modifications may be made, and equivalents may be substituted for elements thereof without departing from the true scope of the invention. In addition, many modifications may be made to adapt a particular situation or material to the teachings of the invention without departing from the central scope thereof. Therefore, it is intended that this invention not be limited to the particular embodiments disclosed, as best modes contemplated for carrying out this invention, but that the invention will include all embodiments falling within the scope of the appended claims.

What is claimed is:

1. An apparatus for measuring the rate of flow of a fluid comprising:
   means for measuring a fluid level to represent a non-linear function of a rate of flow of a fluid;
   electronic means responsive to the measured fluid level for generating an electrical output signal representing the rate of flow of the fluid;
   said electronic means including a function generator disc having a digital code recorded thereon representing the non-linear flow rate and an sensor assembly to sense the digital code to provide the electrical output signal representing the rate of flow of the fluid; and
   positioning means operatively connected to said measuring means for positioning said function generator disc with respect to said sensor assembly;
   said measuring means comprising a bubbler system having a pressure transducer for converting the measured fluid pressure corresponding to the fluid level to an electronic signal proportional to the fluid level.

2. An apparatus as claimed in claim 1, wherein said function generator disc has recorded on it a visual level scale for indicating the fluid level.

3. An apparatus as claimed in claim 1, further comprising level adjust means operatively connected to the function generator disc for rotating the disc with respect to the measuring means so that the indicated fluid level reading will match a fluid level reading in a primary measuring device.

4. An apparatus as claimed in claim 1, wherein the bubbler system further comprises a pump, a supply tank connected to the output of the pump, a bubbler adapted to be disposed beneath the fluid, and an adjustable orifice connected between the output of the supply tank and the bubbler for controlling the control rate of air escaping from the bubbler beneath the fluid.

5. An apparatus as claimed in claim 4, further including a by-pass valve connected in parallel to the adjustable orifice which is opened when the fluid level is rapidly increasing at a pre-determined rate thus allowing the measuring means to respond to a quickly rising fluid level.

6. An apparatus as claimed in claim 1, wherein said positioning means comprises as electronic servo system having one input connected to the output of the pressure transducer, a drive motor connected to the output of the servo system, and a potentiometer having its input connected to the output of the drive motor, the output of the potentiometer being connected to another input of the servo system, the drive motor being operatively connected to the function generator disc for driving it with respect to the sensor assembly.

7. An apparatus as claimed in claim 6, wherein said servo system includes bump circuit means for applying power periodically to the drive motor thereby causing the drive motor to be jarred slightly and keeping it in motion so as to reduce errors in the servo system due to static friction.

8. Apparatus for measuring the rate of flow of a fluid, comprising:
   input means for carrying a first signal representing a non-linear function of a rate of flow of a fluid;
   function means for generating a second signal in response to said first signal, the second signal representing the rate of flow of the fluid;
   said function means including a sensor and a function record member;
   said function record member including said non-linear function recorded on it in a form in which the arguments of the independent variable are positions of the function record member with respect to the sensor and the solution of the function for each argument is recorded in a digital code at said positions;
   said input means including means for positioning said sensor and said function record member with respect to each other at a location representing an argument of said non-linear function of the rate of flow of the fluid;
   said sensor including means for sensing said digital code to provide an electrical output signal indicating the rate of flow of the fluid free from non-linear distortion related to the flow path of the said fluid;
   said function means further including presettable counter means electrically connected to said sensor for receiving a jam signal from said sensor indicating the rate of flow and counting signals and for providing an output signal from the time said jam signal is received until said count signals are counted to the value of said jam signal; an AND gate connected to an output of said pre-settable counter, whereby said AND gate is enabled by said output of said pre-settable counter means until said count signals are counted to the value of said jam signal; means for carrying clock pulses for counting said pre-settable counter to said jam value; and means for carrying clock pulses applied to another input of said AND gate, whereby the output of said AND gate is a series of clock pulses occurring over a portion of time directly proportional to the rate of flow of said fluid.

9. Apparatus according to claim 8 in which said function means further includes a rate multiplier having its input connected to the output of said AND gate, whereby the value set in said rate multiplier causes said output pulses to represent a preselected unit of measurement.

10. Apparatus according to claim 9, further including an integrating counter connected to the output of said rate multiplier, whereby the output of said counter indicates the volume of fluid flowing past said input means.

11. Apparatus according to claim 9, further including a sampler connected to said integrating counter, whereby said sampler is actuated at predetermined periods of time related to the volume of fluid flowing past said meter input means.

12. Apparatus for measuring the rate of flow of a fluid, comprising:
input means for carrying a first signal representing a non-linear function of a rate of flow of a fluid;
function means for generating a second signal in response to said first signal, the second signal representing the rate of flow of the fluid;
said function means including a sensor and a function record member;
said function record member including said non-linear function recorded on it in a form in which the arguments of the independent variable are positions of the function record member with respect to the sensor and the solution of the function for each argument is recorded in a digital code at said positions;
said input means including means for positioning said sensor and said function record member with respect to each other at a location representing an argument of said non-linear function of the rate of flow of the fluid;
said sensor including means for sensing said digital code to provide an electrical output signal indicating the rate of flow of the fluid free from non-linear distortion related to the flow path of the said fluid;
said input means including: a pump; a pressure tank; means connecting the output of said pump to said pressure tank whereby said pressure tank is maintained at a predetermined pressure; a pressure transducer; conduit means having an orifice communicating with said pressure transducer and with said pressure tank;
said conduit means being adapted to be positioned beneath said fluid, whereby the fluid above the open end of said conduit means determines the pressure on said transducer; and
said transducer being connected to said function means to move said sensor and said function record member.

13. Apparatus for measuring the rate of flow of a fluid, comprising:
input means for carrying a first signal representing a non-linear function of a rate of flow of a fluid;
function means for generating a second signal in response to said first signal, the second signal representing the rate of flow of the fluid;
said function means including a sensor and a function record member;
said function record member including said non-linear function recorded on it in a form in which the arguments of the independent variable are positions of the function record member with respect to the sensor and the solution of the function for each argument is recorded in a digital code at said positions;
said input means including means for positioning said sensor and said function record member with respect to each other at a location representing an argument of said non-linear function of the rate of flow of the fluid;
said sensor including means for sensing said digital code to provide an electrical output signal indicating the rate of flow of the fluid free from non-linear distortion related to the flow path of the said fluid;
said input means including a bubbler system having a pressure transducer;
said pressure transducer including means for providing an output signal from said pressure transducer related to the liquid level.

14. An apparatus as claimed in claim 13, wherein the bubbler system further comprises a pump, a supply tank connected to the output of the pump, a bubbler adapted to be disposed beneath the fluid, and an adjustable orifice connected between the output of the supply tank and the bubbler for controlling the control rate of air escaping from the bubbler beneath the fluid.

15. An apparatus as claimed in claim 14, further including a by-pass valve connected in parallel to the adjustable orifice which is opened when the fluid level is rapidly increasing at a pre-determined rate thus allowing the measuring means to respond to a quickly rising fluid level.

16. An apparatus for measuring the rate of flow of a fluid comprising:
bubbler system for measuring the fluid level to represent a non-linear function of a rate of flow of a fluid;
said bubbler system having a pressure transducer for converting the measured fluid pressure corresponding of the fluid level to an electronic signal proportional to the fluid level;
functional generator means having a record of the said non-linear connected to receive the said electronic signal and producing an output signal proportional to the said rate of flow;
said bubbler system comprising a source of pressurized gas, the bubbler adapted to be disposed beneath the fluid, an adjustable orifice connected between the said source and bubbler for controlling the rate of gas escaping from the bubbler beneath the fluid; and
a by-pass valve connected in parallel to the said adjustable orifice which is opened when the fluid level is rapidly increasing at a pre-determined rate thus allowing the measuring means to respond to a quickly rising fluid level.

17. Apparatus for measuring the rate of flow of a fluid, comprising:
input means for carrying a first signal representing a non-linear function of a rate of flow of a fluid;
function means for generating a second signal in response to said first signal, the second signal representing the rate of flow of the fluid;
said function means including a sensor and a function record member;
said function record member having said non-linear function recorded on it in a form in which the arguments of the independent variable are positions of the function record member with respect to the sensor and the solution of the function for each argument is recorded in a digital code at said positions;

said input means including means for positioning said sensor and said function record member with respect to each other at a location representing an argument of said non-linear function of the rate of flow of the fluid;

said sensor including means for sensing said digital code to provide an electrical output signal indicating the rate of flow of the fluid free from non-linear distortion related to the flow path of the said fluid;

counter means responsive to said output signal from said sensor for providing a series of clock pulses over a portion of time directly proportional to the rate of flow of said fluid.

18. Apparatus according to claim 17 in which said means for positioning said sensor and function record member with respect to each other includes means for changing the angular position of said function record member.

19. Apparatus according to claim 17 in which sadi digital code is a Gray code.

20. An apparatus as claimed in claim 17 wherein said measuring means comprises a float-operated device operatively connected to a pulley on one end of a shaft so that when the flow rate changes the fluid level will also change which causes the float-operated device to rise and fall along with the changing fluid level.

21. An apparatus as claimed in claim 17, wherein said measuring means comprises a bubbler system having a pressure transducer for converting the measured fluid pressure corresponding of the fluid level to an electronic signal proportional to the fluid level.

22. Apparatus according to claim 17 in which said function means further includes a rate multiplier having its input electrically connected to the output of said counter means, whereby the value set in said rate multiplier causes said output pulses to represent a preselected unit of measurement.

23. Apparatus according to claim 22 further including an integrating counter connected to the output of said rate multiplier, whereby the output of said counter indicates the volume of fluid flowing past said input means.

24. Apparatus according to claim 23 in which said digital code is a Gray code.

25. Apparatus for measuring the rate of flow of a fluid, comprising:
input means for carrying a first signal representing a non-linear function of a rate of flow of a fluid;
function means for generating a second signal in response to said first signal, the second signal representing the rate of flow of the fluid;
said function means including a sensor and a function record member;
said function record member having said non-linear function recorded on it in a form in which the arguments of the independent variable are positions of the function record member with respect to the sensor and the solution of the function for each argument is recorded in a digital code at such positions;
said input means including means for positioning said sensor and said function record member with respect to each other at a location representing an argument of said non-linear function of the rate of flow of the fluid;

said sensor including means for sensing said digital code to provide an electrical output signal indicating the rate of flow of the fluid free from non-linear distortion related to the flow path of the fluid;
said positioning means comprising an electronic servo system having first and second inputs and an output, a drive motor having an input and an output, and a potentiometer having an input and an output;
said input of said potentiometer being connected to the output of the drive motor;
the output of the potentiometer being connected to the second input of the servo system;
the drive motor being operatively connected to the function generator disc for driving it with respect to the sensor assembly of the servo system being connected to the output;
the first input of the pressure transducer;
the input of the drive motor being connected to the output of the servo system;
said servo system including bump circuit means for applying power periodically to the drive motor thereby causing the drive motor to be jarred slightly and keeping it in motion whereby errors in the servo system are reduced due to static friction.

26. Apparatus for measuring the rate of flow of a fluid, comprising:
input means for carrying a first signal representing a non-linear function of a rate of flow of a fluid;
function means for generating a second signal in response to said first signal, the second signal representing the rate of flow of the fluid;
said function means including a sensor and a function record member;
said function record member including said non-linear function recorded on it in a form in which the arguments of the independent variable are positions of the function record member with respect to the sensor and the solution of the function for each argument is recorded in a digital code at said positions;
said input means including means for positioning said sensor and said function record member with respect to each other at a location representing an argument of said non-linear function of the rate of flow of the fluid;
said sensor including means for sensing said digital code to provide an electrical output signal indicating the rate of flow of the fluid free from non-linear distortion related to the flow path of the said fluid; and
adjust means operatively connected to the function record member for rotating the function record member with respect to the measuring means so that the indicated reading matches a reading in a primary measuring device.

27. Apparatus according to claim 26 for measuring the rate of flow of a fluid, comprising:
counter means responsive to said output signal from said sensor for providing a series of clock pulses over a portion of time directly proportional to the rate of flow of said fluid;
said function means further including a rate multiplier having its input electrically connected to the output of said counter means, whereby the value set in said rate multiplier causes said output pulses to represent a preselected unit of measurement.

* * * * *

UNITED STATES PATENT AND TRADEMARK OFFICE
CERTIFICATE OF CORRECTION

PATENT NO. : 4,072,052

DATED : February 7, 1978

INVENTOR(S) : Louis Franklin Lederer

It is certified that error appears in the above-identified patent and that said Letters Patent are hereby corrected as shown below:

Column 1, line 22, insert the word "to" between the words "arm" and "close".

Column 3, line 47, change "Grayto-binary" to "Gray-to-binary".

Column 5, line 17, change "126" to "26".

Column 6, line 3, after the word "end", insert the word "of".

Column 6, line 10, change the word "elase" to "else".

Column 7, line 11, after the word "with", omit the hyphen.

Column 7, line 66, change the word "presettable" to "pre-settable".

Column 11, line 38, within the parentheses, change "the" to "The".

Column 13, line 57, change "presettable" to "pre-settable".

Column 14, line 29, change "flow of fluid" to "flow of the fluid".

Column 14, line 36, change the word "flow" to "fluid".

Column 15, line 18, change "wellknown" to "well-known".

Column 15, line 44, change the word "an" to "a".

UNITED STATES PATENT AND TRADEMARK OFFICE
CERTIFICATE OF CORRECTION

PATENT NO. : 4,072,052
DATED : February 7, 1978
INVENTOR(S) : Louis Franklin Lederer It is certified that error appears in the above-identified patent and that said Letters Patent are hereby corrected as shown below:

Column 15, line 47, omit the word "and" at the end of the line.

Column 15, line 50, add the word "and" after the semicolon.

Column 16, line 11, change the word "as" to "an".

Column 16, line 51, change the word "presettable" to "pre-settable".

Column 18, line 14, add the word "and" after the semicolon.

Column 18, line 41, after the word "linear", add the word "function".

Column 19, line 11, after the semicolon, add the word "and".

Column 19, line 21, change the word "sadi" to "said".

Column 20, line 20, after the semicolon, add the word "and".

Column 20, line 62, after the semicolon, add the word "and".

Signed and Sealed this

Fifteenth Day of January 1980

[SEAL]

Attest:

SIDNEY A. DIAMOND

Attesting Officer    Commissioner of Patents and Trademarks